Inventor:
Alfred Kreidler

United States Patent Office 2,763,370
Patented Sept. 18, 1956

2,763,370

PROCESS AND APPARATUS FOR THE PRESSING OF EXTENDED BODIES WITH PROFILED HEADS

Alfred Kreidler, Stuttgart, Germany

Application December 17, 1952, Serial No. 326,427

Claims priority, application Germany December 31, 1951

8 Claims. (Cl. 207—9)

The invention concerns the pressing of extended bodies with profiled heads. Such bodies of suitable shape, screw bolts, for instance, have already been manufactured in such a way that the stock was extruded through an extrusion nozzle for the formation of the extended parts, whilst the remainder of the material remaining in the correspondingly shaped holder was intended to form the head of the finished pressed article. This is not a very advantageous method of working, as the impurities of the material accumulate, as is known, in the "pressing residue." The head of the pressed article manufactured by the above method, therefore, has other, mostly more unfavorable qualities of material than the shank of the article.

It is, therefore, one object of the present invention to avoid this disadvantage and to ensure homogeneous properties of the material for the whole product.

It is another object of the present invention to provide a die press operation for the head with an extrusion operation for the shank, which operations are combined in such a way that on an extrusion press the head is moulded in a removable die connected directly to the extrusion nozzle and, after removing the die, the shank is then extruded through the nozzle.

It is still another object of the present invention to provide a method in which an important simplification of the method can be obtained by the feature that the removal of the die is effected automatically depending on the process of the pressing operation. This is conveniently effected by the release of mechanical, hydraulic, pneumatic or electric means, depending on the increase of the extrusion pressure following the filling of the die. In order to avoid excessive formation of flashes on the pressed article it is advisable to interrupt the pressing operation by suitable locking means during the removal of the die, if necessary, automatically.

It is yet another object of the present invention to provide a suitable apparatus for carrying out the method according to the invention, which apparatus is distinguished by the feature that the die connected to the press is constructed with a plurality of parts and its parts, preferably transversely to the direction of pressing, are extendable.

It is also a further object of the present invention to provide an apparatus in which in a corresponding further construction of the invention, the parts of the die are subject to the action of hydraulic motors for their closing together and opening, the control members of which are reversible by a servomotor, actuated by extrusion pressure into the position for opening the die. For the brief interruption of the pressing operation, this servomotor can be coupled simultaneously with means for stopping and starting the extrusion press. It is expedient for the servomotor to have reversing means for the return to the starting position and to be coupled continually with the means for closing and stopping the press and with the control members for the hydraulic motors only for the closing of the die.

With these and other objects in view which will become apparent in the following detailed description, the present invention will be clearly understood in connection with the accompanying drawings, in which.

Figure 1:
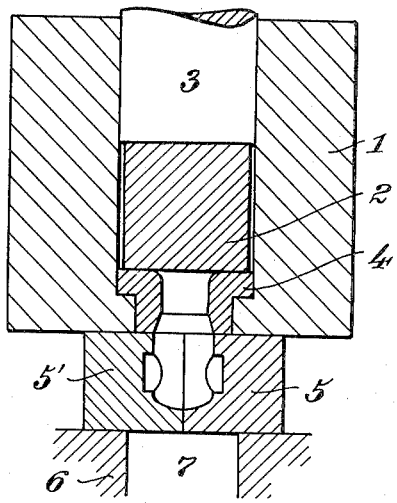
Figure 1 is a fragmentary diagrammatic longitudinal section showing the position of parts of the pressing apparatus at the beginning of the pressing operation.

A press bar 2 (Fig. 1) is inserted in the holder 1 of an extrusion press. This press bar 2 is subjected to pressure by an extrusion die or punch 3. An extrusion nozzle 4 is mounted in the holder. A two part die 5, 5' is in contact with the holder, and is supported on an extrusion table 6, the parts of the die being separable thereon to the right and to the left. The table 6 has a passage opening 7 for the extruded length.

Figure 2:
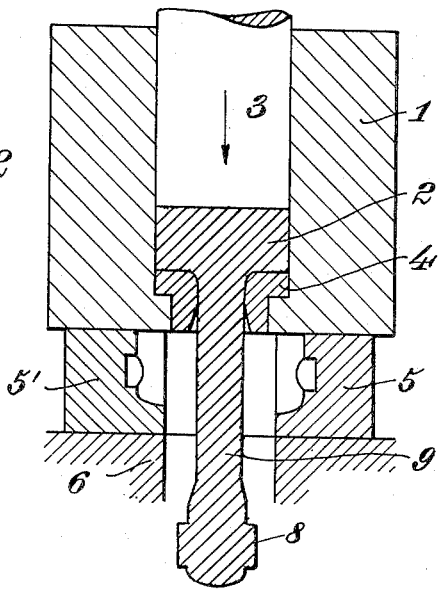
Fig. 2 is a corresponding view but at the second stage of the pressing operation.

After a portion of the material of the bar 2 has been pressed by moving the punch 3 into the die 5, 5' so as to form the head 8, the punch 3 is momentarily stopped and the two parts of the die 5, 5' are moved apart to the left and right respectively. With continued pressing the long part or shank of the body to be produced is extruded through the extrusion nozzle 4 as a length 9 (Fig. 2).

The apparatus can be arranged (Fig. 3) so that the whole operation is allowed to proceed automatically.

Valves 13 and 14 which can be opened and closed by a common shaft 15 are respectively inserted in the supply 10 to the pressing cylinder 11 and in the corresponding discharge 12. A servomotor 17 is connected through an intermediate pipe line 16 to the supply 10. The piston 18 of the servomotor is held stationary by a powerful spring 19. Teeth on the piston rod 20 engage with a gear wheel 21 which is fixedly mounted on the shaft 15 of the two valves 13 and 14. The die parts 5, 5' mounted between holder 1 and extrusion table 6 are mutually separable on the latter, to the left and right. They are respectively attached to the piston rods 22, 22' of the hydraulic motors 23, 23'. A common slide control is provided for reversing these hydraulic motors; and one end of the slide 25 of this control opposes the impact surface of the piston rod 20 of the servomotor 17. The hand lever 26 is jointed to its other end.

Figure 3:
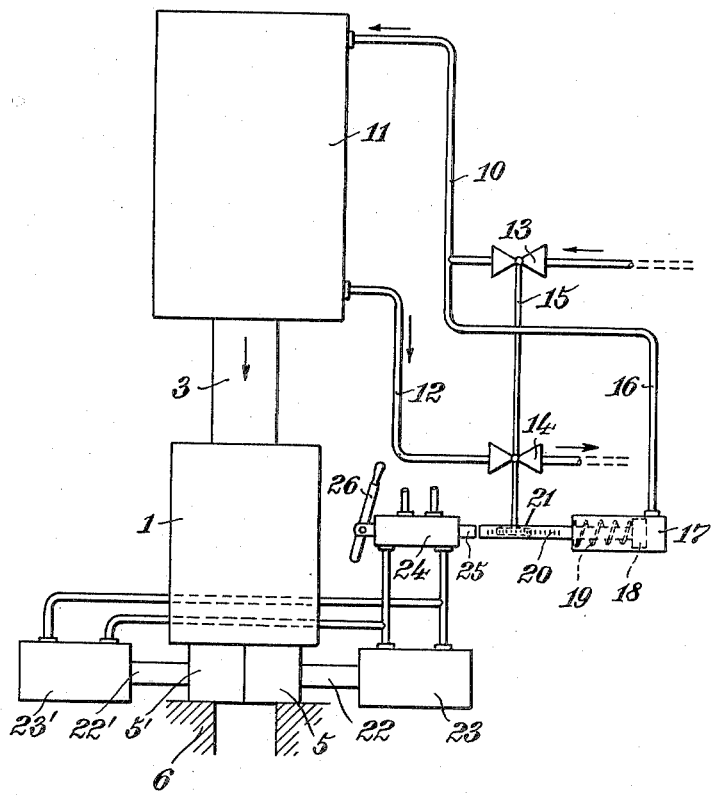
Fig. 3 is a diagram showing the hydraulic arrangement for the automatic control of such a pressing apparatus.

The mode of operation is as follows:

During the first period of the pressing operation the parts are in the position shown in Fig. 3. The die parts 5, 5' are kept closed by the hydraulic motors 23, 23'. Moreover the slide 25 is in its right hand end position. The piston 18 of the servomotor is retained in position by the spring 19 against the action of the extrusion pressure, and the two valves 13 and 14 are open.

After completely filling the die parts 5, 5' the extrusion pressure suddenly increases violently. It overcomes the resistance of the spring 19 and the piston 18 is moved to the left. At the same time the piston rod 20 strikes against the slide 25 and likewise displaces this to the left, and simultaneously closes the valves 13 and 14 through the gear connection 21, 15 and thus stops the press 11, 3. The hydraulic motors 23, 23' are reversed as a result of the displacement of the slide 25. They now pull the die parts 5, 5' away from one another to the right and to the left respectively. The opening of the die causes an immediate drop in the operational pressure. The spring 19 returns the piston 18 to its position of rest. At the same time, the shaft 15 opens the valves 13 and 14 again. The extrusion punch 3 moves further and the pressing operation is continued. As the slide 25, however, remains stationary, the hydraulic motors 23, 23' keep the die parts 5, 5' in their separated condition.

After removing the pressing residue from the press and re-feeding the holder the slide 25 is again returned to the position shown in Fig. 3, by the hand lever 26, whereupon the hydraulic motors 23, 23' put the die parts 5, 5' together for the beginning of the next pressing operation, and keep them in this closed position.

While I have disclosed one embodiment of the present invention, it is to be understood that this embodiment is given by example only and not in a limiting sense, the scope of the present invention being determined by the objects and the claims.

I claim:

1. A process for the production of a body having a head and a shank in an apparatus having an extrusion nozzle and a movable closed die in communication therewith, for die-pressing of the said head, comprising the steps of initially deforming stock in a die-pressing operation through said extrusion nozzle in order to form the said head, releasing the said formed head from said die by complete lateral removal of the latter in response to completion of the said die-pressing operation, and then continuing by subjecting the said stock to an extrusion operation in the same direction as that in said die-pressing operation in order to form the said shank integrally with said head in one continuous operation.

2. A process for the production of a body having a head and a shank in an extrusion apparatus having an extrusion nozzle and a movable die in communication therewith for die-pressing of the said head, comprising the steps of initially deforming stock in a die-pressing operation through the said extrusion nozzle in order to form the said head, releasing the said head from said die by complete lateral removal of the latter in response to completion of the said die-pressing operation, and then automatically continuing by subjecting the said stock to an extrusion operation in the same direction in order to form the said shank integrally with said head in one continuous operation.

3. In an apparatus for making bodies having a head and a shank by die-pressing and extruding, a holder including an extrusion nozzle, a removable closed die, the said extrusion nozzle being disposed in juxtaposition and alignment with the entrance of said removable closed die to perform the die-pressing through the said extrusion nozzle into the said die, and means responsive to the completion of the said die-pressing for lateral removal of the said die from its operative position to an inoperative position, in order to permit the continuous extrusion operation through the said extrusion nozzle.

4. In an apparatus for making bodies having a head and a shank by die-pressing and extruding, a holder including an extrusion nozzle, a removable closed die having a die cavity of a width greater than that of said extrusion nozzle, the said extrusion nozzle being disposed in juxtaposition and alignment with the entrance of the cavity of said removable closed die to perform the die-pressing through the said extrusion nozzle into the said die, and means responsive to the completion of the said die-pressing for removal of the said die from its operative position to an inoperative position, in order to permit the continuous extrusion operation through the said extrusion nozzle.

5. The structure, as set forth in claim 3, which includes means for momentarily interrupting the application of pressure to the stock.

6. The structure, as set forth in claim 3, which includes automatic locking means for momentarily interrupting the application of pressure to the stock.

7. The structure, as set forth in claim 3, wherein the die is separable into a plurality of parts in a direction transversely to the direction of extrusion.

8. In an apparatus for making bodies having a head and a shank by die-pressing followed by extrusion through an extrusion nozzle, a separable multi-part die, the said extrusion nozzle being disposed in juxtaposition and alignment with the entrance of said multi-part die to perform the die-pressing through said extrusion nozzle into the said die, hydraulic motors operatively connected to the said die to effect assembly and separation of its parts, a servo-motor responsive to pressure obtaining in the stock to be die-pressed and extruded, and control members for said hydraulic motors connected so as to be reversed by said servo-motor into position for separation of said parts and manually operated means for said hydraulic motors connected to be reversed into position for assembly of said parts.

References Cited in the file of this patent

UNITED STATES PATENTS

| | | |
|---|---|---|
| 1,403,460 | Talty | Jan. 10, 1922 |
| 1,808,431 | Osborne | June 2, 1931 |
| 2,115,519 | Talbot et al. | Apr. 26, 1938 |
| 2,261,318 | Wilcox | Nov. 4, 1941 |
| 2,356,695 | Priest | Aug. 22, 1944 |
| 2,392,175 | Norton | Jan. 1, 1946 |
| 2,586,336 | Huck | Feb. 19, 1952 |
| 2,656,743 | Leavenworth | Oct. 27, 1953 |
| 2,668,345 | Eckstein | Feb. 9, 1954 |

FOREIGN PATENTS

| | | |
|---|---|---|
| 166,625 | Great Britain | July 11, 1921 |
| 518,037 | Great Britain | Feb. 15, 1940 |